United States Patent [19]

Yoshino et al.

[11] Patent Number: 4,761,750
[45] Date of Patent: Aug. 2, 1988

[54] ELECTRONIC CALCULATOR WITH A PROGRAM CALCULATION FUNCTION

[75] Inventors: Hiroyuki Yoshino; Morito Tamiya, both of Tokyo, Japan

[73] Assignee: Casio Computer Co., Ltd., Tokyo, Japan

[21] Appl. No.: 719,368

[22] Filed: Apr. 3, 1985

[30] Foreign Application Priority Data

Apr. 12, 1984 [JP] Japan .................................. 59-73581

[51] Int. Cl.⁴ ............................................. G06F 15/02
[52] U.S. Cl. ...................................... 364/709; 364/706
[58] Field of Search ................. 364/709, 900 MS File, 364/706; 235/61 R

[56] References Cited

U.S. PATENT DOCUMENTS

| 4,037,092 | 7/1977 | Osborne et al. | 364/706 |
| 4,099,246 | 7/1978 | Osborne et al. | 364/709 |
| 4,115,870 | 9/1978 | Lowell | 364/900 |
| 4,530,068 | 7/1985 | Nakanishi et al. | 364/706 |
| 4,554,641 | 11/1985 | Haneda et al. | 364/706 |

FOREIGN PATENT DOCUMENTS

| 2748951 | 5/1979 | Fed. Rep. of Germany | 364/709 |
| 0052537 | 4/1977 | Japan | 364/709 |
| 0051748 | 4/1979 | Japan | 364/709 |

OTHER PUBLICATIONS

Greenfield et al., *Using Micro Processors and Microcomputers The 6800 Family*, 1981, pp. 88 and 118.
Uffenbeck, *Microcomputers and Microprocessors: The 8080, 8085, and Z-80 Programming, Interfacing, and Troubleshooting*, 1985, pp. 91-93.

*Primary Examiner*—Gary V. Harkcom
*Assistant Examiner*—Long Thanh Nguyen
*Attorney, Agent, or Firm*—Frishauf, Holtz, Goodman & Woodward

[57] ABSTRACT

An electronic calculator has a program calculation function. The calculator also includes a key for designating substitution of numeral data for variables, a key for designating a variable, and a key for representing an interval of variables in addition to normal numeric keys. When numeral data (e.g., 10) is to be substituted for variables (e.g., A to D and H to K) among certain program variables, an operator designates numeral data "10", variables A to D and H to K with the keys. A control section then starts a substituting operation by storing the numeral data "10" in memory areas of a variable memory defined by addresses corresponding to the variables A to D and H to K. Thus, the numeral data "10" is substituted for the variables A to D and H TO K.

4 Claims, 4 Drawing Sheets

ELECTRONIC CALCULATOR WITH A PROGRAM CALCULATION FUNCTION

BACKGROUND OF THE INVENTION

The present invention relates to an improvement in an electronic calculator with a program calculation function and, more particularly, to an electronic calculator in which numeral data can be easily substituted for variables in a program.

An electronic calculator with a program calculation function is known. Such a calculator is disclosed in, for example, U.S. Pat. No. 4,037,092 and U.S. Pat. No. 4,099,246. Such an electronic calculator is also called a programmable electronic calculator. This type of electronic calculator performs a calculation in accordance with a program in the following manner. A calculation program is stored in the electronic calculator. When numeral data of the variable data is input into the calculator, the calculator executes a predetermined calculation in accordance with the program.

The programmable calculator generally comprises a variable memory. The variable memory has a plurality of memory areas corresponding to variables in order to store numeral data which are substituted therefor. The calculator stores numeral data of the respective variables and executes calculations designated by the program in accordance with the stored data. In order to allow numeral data to be stored in the variable memory, a memory key such as "Min", "M+", "M−" is generally used. In an electronic calculator which can use a BASIC language, numeral data is substituted for a variable. For example, numeral data is substituted for a variable by using an equation such as A=0, B=3.

When the programmable calculator of the type described above is used, the same numeral data must sometimes be substituted for a plurality of variables. In other words, the same data must be stored in different memory areas of the variable memory. In this case, the memory key must be operated several times corresponding to the number of variables to be substituted. In an electronic calculator which can use a BASIC language, the number of equations must be equal to the number of variables for which data is to be substituted. For example, when the numeral "10" is substituted for variables A to Z, the memory key must be operated twenty-six times. In the calculator which can use the BASIC language, 26 equations are required.

In this manner, in the above-mentioned programmable electronic calculator, when the number of variables for which numeral data is to be substituted is increased, an operation for substituting numeral data is cumbersome, resulting in frequent erroneous operations.

SUMMARY OF THE INVENTION

It is an object of the present invention to provide an electronic calculator with a program calculation function in which numerals can easily be substituted for variables with a simple key operation.

In order to achieve the above object, there is provided an electronic calculator according to the present invention, including:

a program memory for storing a program constituted by designated variables of ordered variables;

a variable memory, having addresses with the respective ordered variables, for storing designated numeral data of the ordered variables;

a key input section including a numeric key, a function key, variable designation keys for designating first and second variables as first and last variables among the ordered variables for which the numeral data are to be substituted, and an interval designation key for designating all of at least two variables between the first and second variables and including the first and second variables;

a first memory for storing an address among the addresses of the variable memory which corresponds to the first variable;

a second memory for storing an address among the addresses of the variable memory which corresponds to the second variable;

an updating circuit for updating a storage content of the first memory;

a comparing circuit for comparing the addresses stored in the first and second memories so as to generate a signal corresponding to a comparison result; and a control circuit which controls the updating circuit so as to update the storage content of the first memory until the comparing circuit determines that the address stored in the first memory exceeds the address stored in the second memory, controls the variable memory so as to store the designated numeral data in a memory area of the variable memory defined by the address stored in the first memory, and stores the designated numeral data in memory areas of the variable memory defined by addresses corresponding to all the variables designated by the interval designation key.

With the above arrangement, in the electronic calculator according to the present invention, when the first and second variables among the ordered variables are designated, no data input operation is required for the variables therebetween. For this reason, the same numeral can be substituted for a plurality of variables with a simple key operation.

DETAILED DESCRIPTION OF THE PREFERRED EMBODIMENTS

An electronic calculator according to an embodiment of the present invention will be described with reference to FIG. 1 and FIGS. 2A to 2C.

Figure 1:
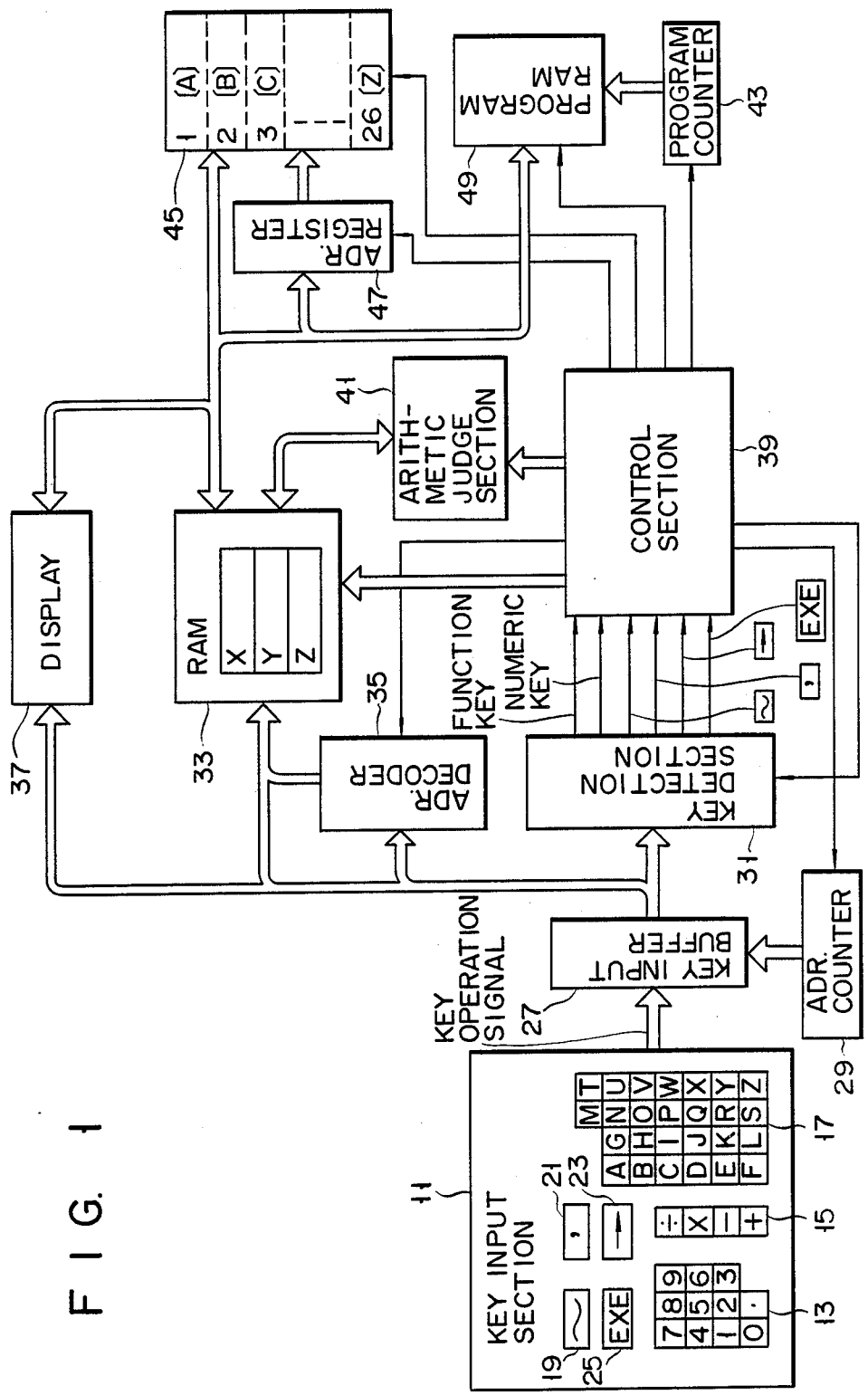
FIG. 1 is a block diagram showing an arrangement of an electronic calculator according to an embodiment of the present invention.

Referring to FIG. 1, an arrangement of the electronic calculator according to the embodiment of the present invention will be described.

First, assume that the electronic calculator can store a program with up to 26 variables "A" to "Z".

A key input section 11 comprises numerical keys 13 and function keys 15. The section 11 further comprises variable keys 17( A to Z ), an interval designation key 19 ( ⊂⊐ ), a break key 21 (┬), a substitution key 23 ( ⊟ ), and an execution key 25 ( EXE ). The keys 17 are provided for designating variables for which numeral data is substituted in the program. In other words, the keys 17 are provided for designating addresses of a variable memory 45 (to be described later). The key 19 is provided for designating an interval of the variables for which the numeral data is substituted. That is, the key 19 is used to designate a memory area of the variable memory 45. The key 21 is provided for indicating a break of the variables for which the numeral data is substituted. The key 23 is used for substituting numeral data for variables. The key 25 is used for initiating a processing illustrated by a flow chart (to be described later). The section 11 generates a key operation signal represented by code data in response to a key operation.

A key input buffer 27 receives the key operation signal from the section 11. The buffer 27 stores the data from the section 11 at an address designated by an address counter 29 in the order input. The data stored in the buffer 27 is transferred to a key detection section 31, a RAM 33, an address decoder 35 and a display 37. The decoder 35 produces an address of the variable memory 45 corresponding to the variable designated by the corresponding variable key 17. A result of the calculation by the decoder 35 is supplied to the RAM 33. In response to the key operation signal from the buffer 27, the section 31 determines which key is operated.

A control section 39 receives a detection result from the section 31. The control section 39 controls operations of respective portions in accordance with the detection result. For example, the control section 39 supplies a count-up/down signal to the decoder 35 and a program counter 43. The control section 39 controls operations of the RAM 33 and an arithmetic/judge section 41. The RAM 33 has at least X, Y and Z registers for calculation. The storage content of the RAM 33 is supplied to the section 41, the memory 45, an address register 47 and a program RAM 49. The RAM 49 sequentially stores the program in an area designated by the counter 43.

The variable memory 45 stores numeral data for the variables A to Z. For this purpose, the memory 45 has addresses "1" to "26" which correspond one-to-one with the variables A to Z. The memory 45 supplies/receives data to/from the RAMs 33 and 49.

Figure 2A:
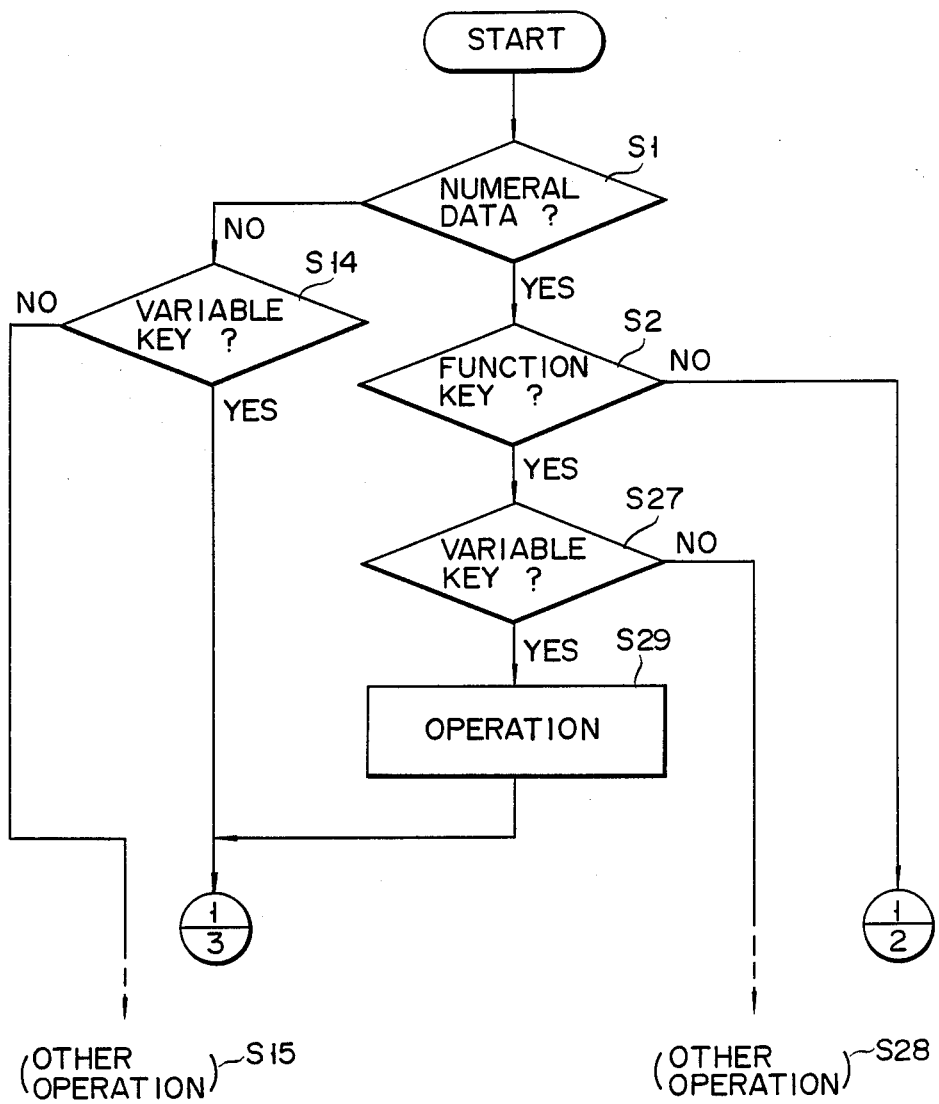
FIGS. 2A to 2C are flow charts for explaining an operation of the electronic calculator according to the embodiment of the present invention.
Figure 2B:
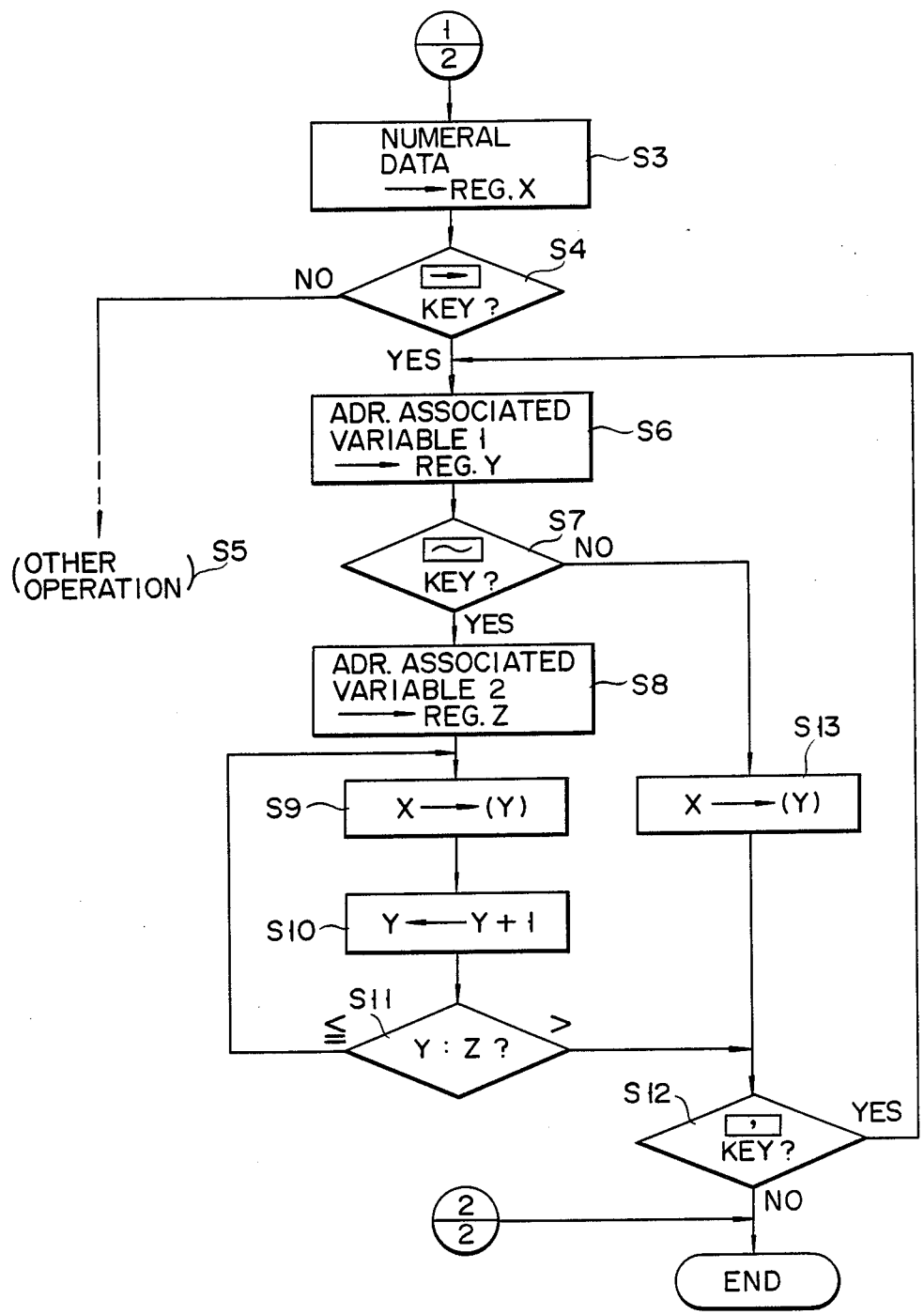
Figure 2C:
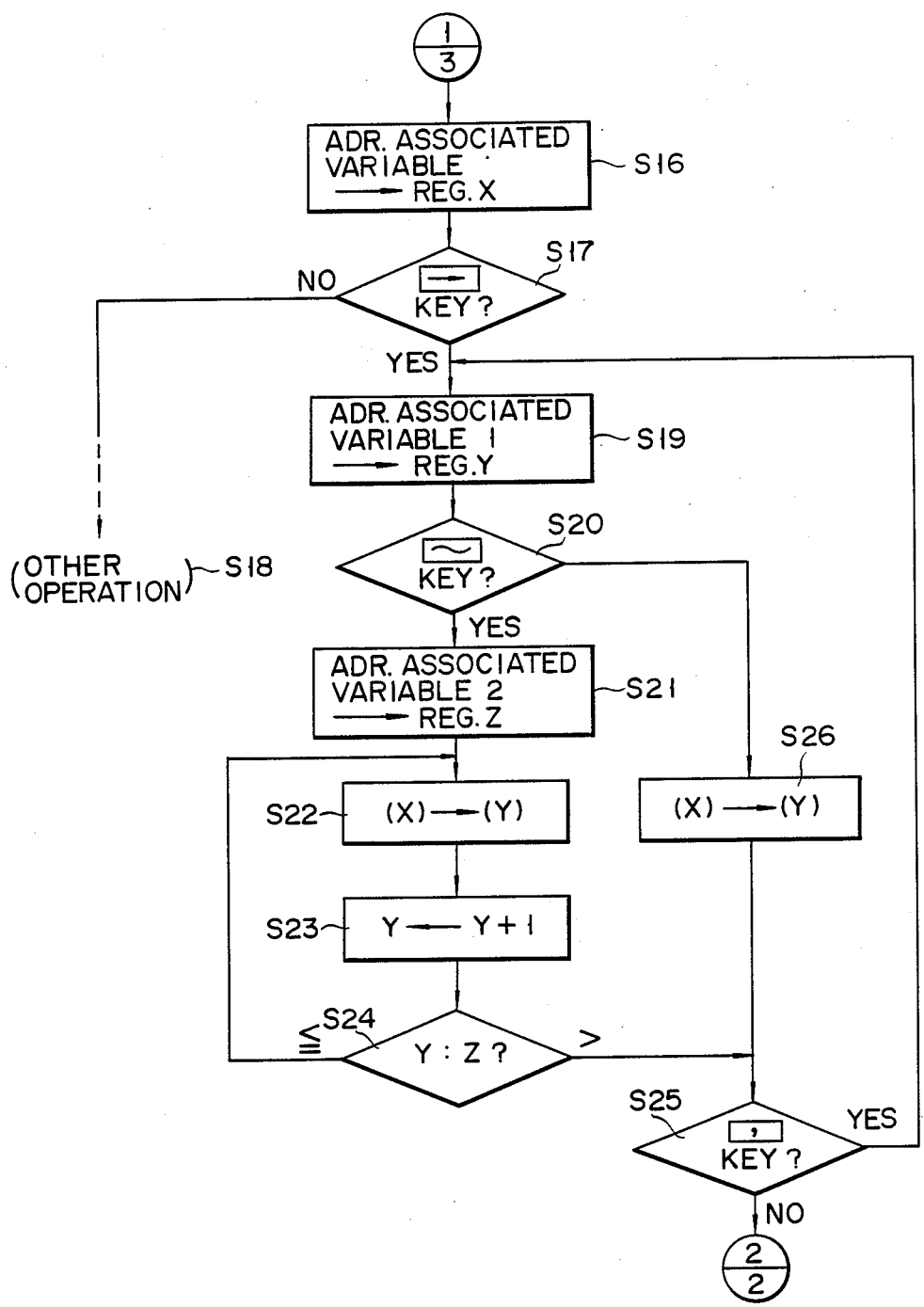

Operation of the electronic calculator with the above arrangement will be described with reference to the flow charts shown in FIGS. 2A to 2C.

Numeral data input from the key input section 11 or that already stored in the memory 45 can be substituted for the variables A to Z. The input numeral data or the stored numeral data can be stored in the memory 45.

A case will be described where the numeral data input from the section 11 is substituted for variables, in particular, where the numeral "10" is substituted for the variables A, B, C and D; and H, I, J and K.

An operator operates the keys of the section 11 in the following manner.

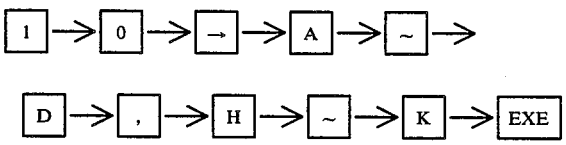

First, the numeral "10" to be substituted is designated. Then, the substitution key 23 indicating substitution of the numeral is operated. A first variable A in a first group of sequential variables for which the numeral is substituted (in this case, A to D) is designated as a first variable. The interval designation key 19 is then operated. A last variable D in the first group of the sequential variables for which the numeral is to be substituted is designated as a second variable. Thus, an interval of the variables A to D is designated. The break key 21 indicating a break of the variables for which the numeral is to be substituted is operated. Furthermore, a first variable H in a second group of the sequential variables for which the numeral is to be substituted (in this case H to K) is designated as a first variable. The key 19 is then operated. A last variable K in the second group of sequential variables H to K is designated as a second variable. Thus, an interval of the variables H to K is designated. Finally, the execution key 25 for starting an operation is depressed.

The key operation signals corresponding to the above key operations are supplied to the key input buffer 27. The buffer 27 sequentially stores the input signals at areas designated by the address counter 29. The key detection section 31 reads out the data stored in the buffer 27 in the order stored (in a first-in, first-out manner). The section 31 detects the readout data and determines which keys are operated.

The key operations are performed in the above manner, and when the execution key 25 (EXE) is finally operated, the control section 39 starts operating. The control section 39 starts the processing shown in the flow charts of FIGS. 2A to 2C. The control section 39 performs operations upon sequentially reading out data from the buffer 27.

In step S1, the control section 39 determines if the input data is numeral data. This is because the variable can be input first (as will be described later). In this embodiment, the numeral "10" is input. Therefore, the control section 39 determines in step S1 that numeral data is input, and the control flow advances to step S2. In step S2, it is determined if the function key 15 is operated after inputting the numeral "10". This is because the calculation result can be substituted for the variable (as will be described later). Since a key other than the key 15 (the substitution key 23 (═▶)) is operated after the numeric key, the control flow advances to step S3.

In step S3, the numeral data ("10") is stored in the X register of the RAM 33. The control flow advances to step S4, and it is determined if the substitution key (═▶) is operated. If NO in step S4, the control flow advances to step S5. In step S5, other operation is performed in accordance with the key input from the section 11. However, in this case, since the substitution key 23 is operated after inputting the numeral data "10", the control flow advances to step S6.

In step S6, an address in the memory 45 corresponding to the first variable is obtained. The address is obtained by the address decoder 35 and is stored in the Y register of the RAM 33. Since the variable is A, the address "1" corresponding thereto is stored in the Y register.

The control flow then advances to step S7. In step S7, it is determined if the interval designation key 19 is operated. If YES in step S7, the control flow advances to step S8. In step S8, an address in the memory 45 corresponding to the second variable is obtained. The corresponding address is obtained by the decoder 35 and is stored in the Z register. Since the second variable is "D", the address "4" corresponding to the variable D is stored in the Z register.

The control flow then advances to step S9. In step S9, the address stored in the Y register is set in the address register 47. The register 47 designates the address "1" in the memory 45. The numeral data "10" stored in the X register is stored at a location defined by the address "1" in the memory 45. The control flow advances to step S10. In step S10, the address stored in the Y register is updated (incremented by "1").

The control flow advances to step S11. In step S11, it is determined if the address stored in the Y register exceeds the address stored in the Z register. If the content of the Y register is equal to or smaller than that of the Z register, the control flow returns to step S9. The address is updated in step S10, and the address "2" (corresponding to the variable B) is designated. Therefore, in step S11, it is determined that the content of the Y register is smaller than that of the Z register. Therefore, the control flow returns to step S9.

In step S9, the register 47 designates the address "2" in the same manner as described above. The content "10" of the X register is stored at a location defined by the address "2" in the memory 45. In the same manner the content of the X register "10" is stored in locations defined by the addresses "2" and "3". That is, the numeral "10" is substituted for the variables B and C. Finally, the numeral data "10" is stored in a location defined by the address "4" in the memory 45. Thereafter, in step S10, the address stored in the Y register is updated, i.e., the content of the Y register is turned into the address "5". In step S11, it is determined if the content of the Y register is larger than that of the Z register. Since content of the Y register ("5") is larger the content of the Z register ("4", the control flow advances to step S12. In step S12, the control section 39 determines if the break key 21 is operated after the second variable (D). Since the key 21 is operated after the second variable (D), the control flow returns to step S6. In step S6, the address corresponding to the first variable is stored in the Y register. The address "8" corresponding to the variable H is stored in the Y register. The control then advances to step S8. In step S8, the address corresponding to the second variable is stored in the Z register, i.e., the address "11" associated with the variable K is stored in the Z register. Thus, the operations from steps S9 to S11 are repeated, and the numeral data "10" is stored in locations defined by the addresses "8" to "11" in the memory 45. So, the numeral "10" is substituted for the variables H to K.

After the numeral "10" is substituted for the variable K, the address "12" is stored in the Y register, in step S10. Thus, in step S11, it is determined that the content of the Y register (address "12") exceeds that of the Z register (address "11"). The control flow advances to step S12. Since the key 21 is not operated after the variable K, the control flow ends. Like this, the numeral data "10" is written in the locations defined by the addresses "1" to "4" and "8" to "11" in the memory 45. In other words, the numeral "10" is substituted for the variables A to D and H to K.

Thus, when the first and second variables are designated, the same numeral data can be easily substituted for a plurality of variables.

For example, when the numeral "10" is substituted for the variables A and H to K, the key operation is as follows:

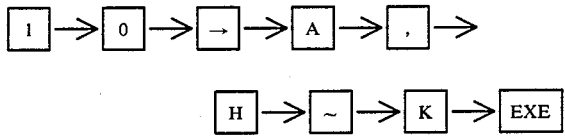

In this case, in step S7, it is determined that the interval designation key 19 is not operated, and the control flow advances to step S13. The numeral "10" is substituted only for the variable A. Thereafter, the control flow advances to step S12, and the operations of steps S6 to S12 are repeated so as to substitute the numeral "10" for the variables H to K.

The operation for substituting numeral data for variables by utilizing data stored in the variable memory 45 will be described hereinafter. For example, a case will be described when the numeral data "10" stored at the address 1 of the memory 45 is substituted for the variables C to H. In this case, the variable C is designated as the first variable and the variable H is desingated as the second variable. The key input section 11 is operated as follows:

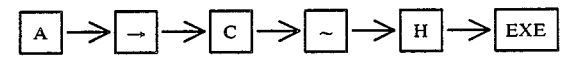

In the same manner as described above, the operation data of the keys is supplied to the key input buffer 27 and is temporarily stored. When the execution key 25 is operated, the control section 39 starts the processing illustrated by the flow charts shown in FIGS. 2A to 2C while reading out the data from the buffer 27.

In step S1, it is determined that numeral data is not input first, and the control flow advances to step S14. In step S14, it is determined if the variable key 17 is operated. If it is determined in step S14 that the key 17 is not operated, the section 11 has designated other operation. Therefore, the control flow advances to step S15. Since the variable key "A" is operated, the control flow advances to step S16. In step S16, the address decoder 35 calculates the address corresponding to the designated address in the memory 45, so the address "1" corresponding to the variable A is obtained. Thus, the address "1" is stored in the X register. In step S17, it is determined if the substitution key 23 is operated. If NO in step S17, an operation other than the substitution operation has been designated. Therefore, the control flow advances to step S18, and the other operation is performed. On the other hand, if YES in step S17, the control flow advances to step S19. In this case, since the substitution key 23 is operated, the control flow advances to step S19.

In step S19, the address corresponding to the first variable is obtained by the address decoder 35. The obtained address is stored in the Y register. So, the address "3" associated with the variable C is obtained. The control flow then advances to step S20. In step S20, it is determined if the interval designation key 19 is operated. Since the key 19 is operated, the control flow advances to step S21. In step S21, the address corresponding to the second variable is obtained by the decoder 35 and is stored in the Z register. Therefore, the address "8" corresponding to the variable H is obtained and is stored in the Z register.

The control flow then advances to step S22. In step S22, a content of the memory 45 at a location defined by the address stored in the X register is stored at a location defined by the address stored in the Y register. In this case, the content "10" at the address "1" of the memory 45 is stored at a location defined by the address "8" stored in the Y register. In step S23, the content of the address stored in the Y register is updated. Therefore, the content of the Y register designates the address "4" in the memory 45. In step S24, the content of the address stored in the Y register is compared with that stored in the Z register. Since the content of the Y register is the address "4" and that of the Z register is the address "8", the content of the Y register is smaller than or equal to that of the Z register. For this reason, the control flow returns to step S22. Similarly, the numeral data "10" is stored in the addresses "9" and "10" in the memory 45. After substituting the numeral data "10" for the variable H, when the content of the Y register is updated in step S23, the content thereof becomes larger than that of the Z register. Therefore, in step S24, it is determined that the content of the Y register is larger than that of the Z register. The control flow thus advances to step S25, and it is determined if the break key 21 is operated. If the break key 21 is operated, the control flow returns to step S19 in order to perform a predetermined operation for instructions of the key 21 and those operated thereafter. On the other hand, if the key 21 is not operated, the data substituting operation is completed. Since the key 21 is not operated, the control flow ends.

If it is determined in step S20 that the key 19 is not operated, the control flow advances to step S26. The storage content at a location defined by the address stored in the X register is stored at a location defined by the address stored in the Y register. Furthermore, the control flow advances to step S25, and if YES in step S25, the flow returns to step S19 in order to execute the instructions of the break key 21 and those operated thereafter. If NO in step S25, the data substituting operation is completed.

In this embodiment, the numeral data directly input from the key input section 11 or read out from the memory 45 is substituted for the variables. However, the present invention is not limited to this. Data of a given calculation result can be substituted for variables. For example, when the value of the variable A stored in the address "1" of the memory 45 is doubled and is substituted for other variables C to H, the following key operation is performed:

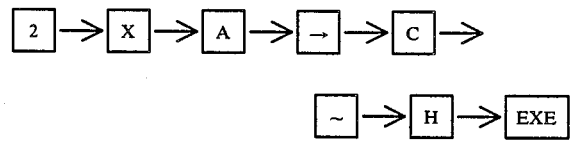

When the execution key 25 is operated, the presence/absence of numeral data is checked in step S1. In step S2, it is checked if the function key 17 is operated. Since the key "×" is operated, the control flow advances to step S27. In step S27, it is determined if the variable key 17 is operated. If NO in step S27, the control flow advances to step S28 in order to perform the operation in accordance with the instruction of the section 11. On the other hand, if YES in step S27, the control flow advances to step S29. In step S29, the calculation designated before operation of the key 23 is performed, and the calculation result is stored in the address "1" in the memory 45 as the variable A. In this case, "2×A" is calculated. The operations of step S16 and those thereafter shown in FIG. 2C are repeated, and the value of the variable A (which is newly substituted) is substituted for the variables C to H.

As described above, according to the present invention, the same numeral data can be substituted for a plurality of addresses with a simple key operation. In other words, numeral data can be easily and quickly substituted for the variables. Furthermore, since fewer key operations are required, an erroneous operation is less likely to occur.

It should be noted that the present invention is not limited to the above embodiments. For example, the variable keys 17, which are used in the embodiments to designate the variables for which the numerical data is substituted, further, may be used to input character data, commands of programs, etc. The numeral data is stored at continuous addresses "1" to "26" corresponding to the variables A to Z, but the correspondence between the variables and addresses can be desirably changed. The content of the Y register is incremented by "1", but it can also be incremented by an arbitrary number. Alternatively, numeral data can be stored in the memory 45 while counting down the content of the Y register. In the above embodiment, the case has been described where the calculation designated before the substitution key 23 is operated is "A×2". However, the calculation is not limited to this, and various kinds of calculations can be executed. The present invention is not limited to the flow charts shown in FIGS. 2A to 2C. If substantially the same operation is obtained, the operation can be performed in accordance with any flow chart. The key operation shown in the above embodiment is an example, and is not limited to such operation. Key symbols printed on the interval designation key 19 and the break key 21 are not limited to those shown herein.

What is claimed is:

1. An electronic calculator with a program calculation function, comprising:

key input means including numerical keys for inputting numerical data, function keys, variable keys corresponding to a plurality of variables and arranged to designate selected ones of said variables, and an interval key for indicating a group of variables defined between two designated variables;

program memory means for storing program data which contains designated variables among said plurality of variables;

variable memory means for storing numerical data, said variable memory means including a plurality of memory areas arranged in a predetermined incremental order, each of said memory area corresponding to a different one of said plurality of variables, and said memory areas are arranged to be addressable by address data which defines an associated variable;

first memory means for storing address data corresponding to a first designated variable selected by operation of a first variable key;

second memory means for storing address data corresponding to a second designated variable selected by a second variable key operated consecutively after operation of said first variable key and said interval key in the stated order;

comparing means for comparing the address data stored in said first memory means with the address stored in said second memory means, and for generating a comparing signal corresponding to a comparison result;

updating means for receiving the comparing signal and for incrementing the address data stored in said first memory means until the incremented address data in said first memory means at least coincides with the address data in the second memory means; and control means for controlling said variable memory means to store a predetermined numerical data input by said numerical keys at corresponding memory area addressed by original address data corresponding to said first designated variable, and by the incremented addreses data as stored in said first memory means by operation of said updating means;

wherein the predetermined numerical data is stored in those memory areas of said variable memory means associated with the group of consecutive variables indicated by operation of said interval key.

2. A calculator according to claim 1, comprising third memory means for storing numerical data inputted from said key input means, and wherein said control means includes means for transferring the numerical data stored in said third memory means to said variable memory means.

3. A calculator according to claim 1, comprising third memory means for storing an address data of a designated variable inputted from said key input means, and said control means includes means for transferring numerical data in the memory area addressed by the address data in said third memory means to said variable memory means.

4. A calculator according to claim 1, wherein said key input means comprises a break key which indicates a break between a plurality of designated consecutive variables and at least one other variable; and said control means includes means for controlling said variable memory means so that numerical data is stored into memory areas corresponding to the designated consecutive variables and said at least one other variable.

* * * * *